Aug. 27, 1957
B. THOMPSON
2,804,336
PICK-UP TOOL
Filed Aug. 12, 1953
2 Sheets-Sheet 1
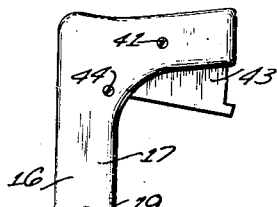
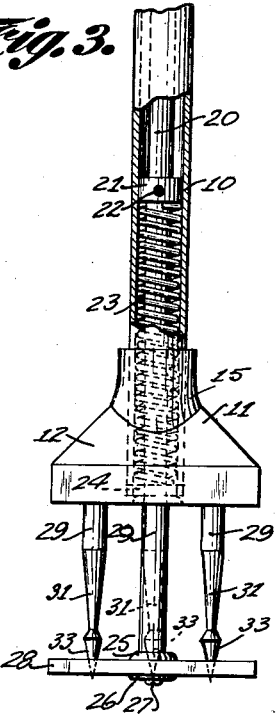
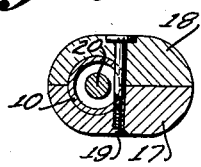
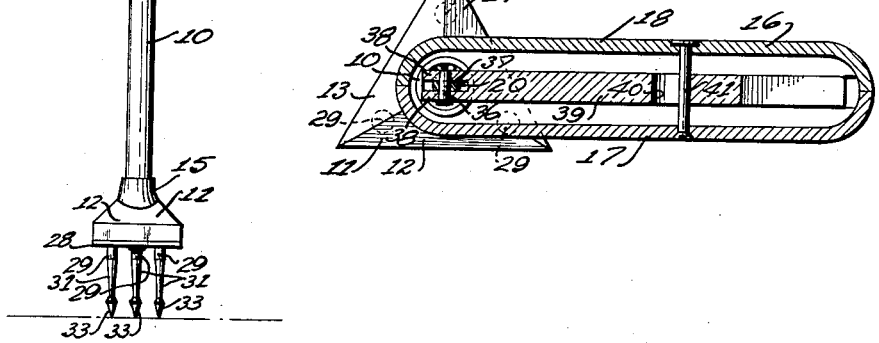
INVENTOR.
Bryan Thompson.
BY Victor J. Evans & Co.
ATTORNEYS Aug. 27, 1957　　　B. THOMPSON　　　2,804,336
PICK-UP TOOL
Filed Aug. 12, 1953　　　2 Sheets-Sheet 2
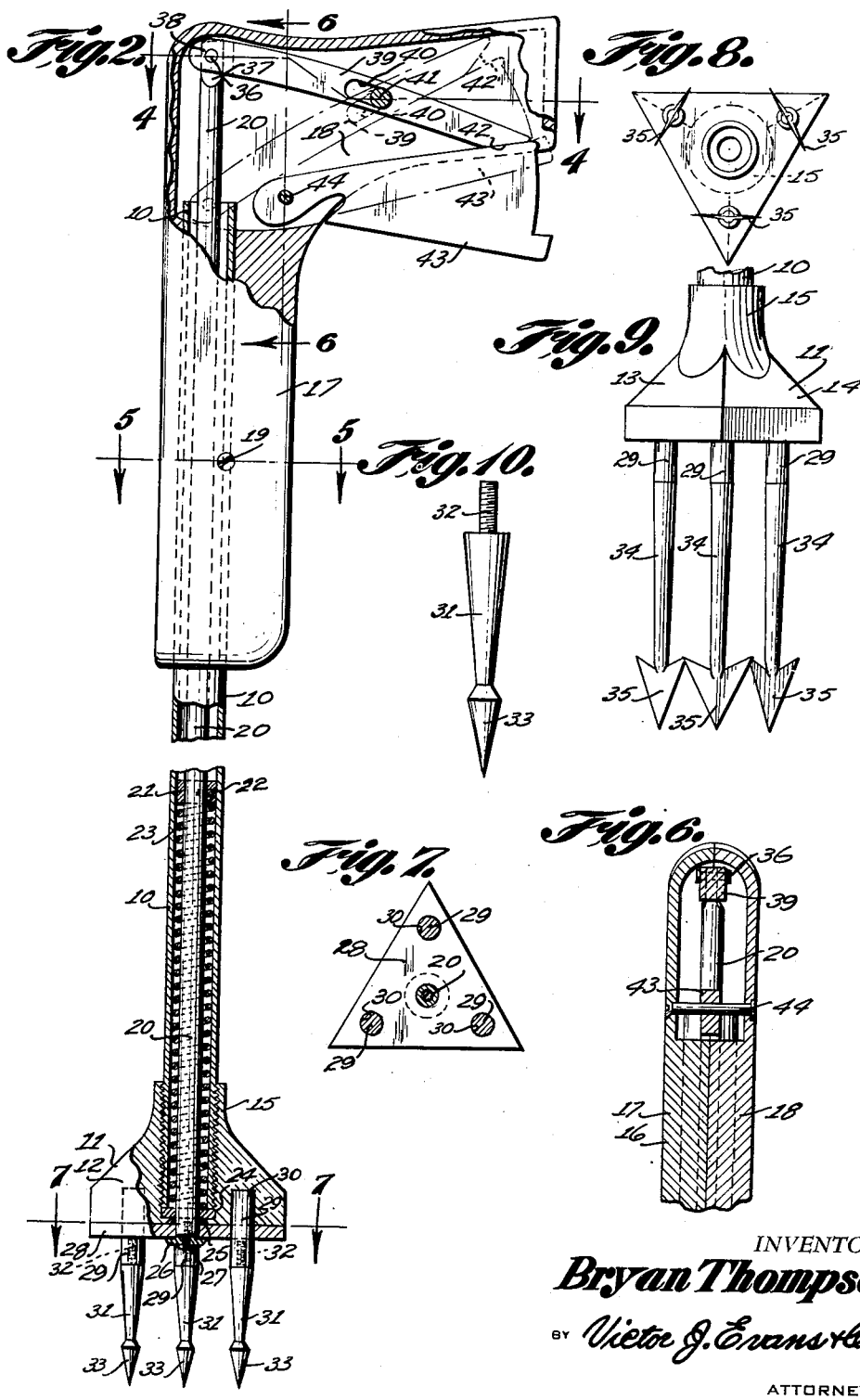
INVENTOR.
*Bryan Thompson*
BY *Victor J. Evans & Co.*
ATTORNEYS United States Patent Office 2,804,336
Patented Aug. 27, 1957

2,804,336

PICK-UP TOOL

Bryan Thompson, Houston, Tex.

Application August 12, 1953, Serial No. 373,759

1 Claim. (Cl. 294—61)

This invention relates to a pickup implement or tool, and more particularly to a manually operable tool for use in picking up trash, leaves, papers and the like from the ground.

The object of the invention is to provide a tool which can be manually operated by a person standing upright so that papers, leaves, trash and the like can be easily and efficiently picked up from the ground, there being a novel mechanism for ejecting the papers or trash from the tool into a container or other suitable receptacle.

This invention is an improvement over the tool shown and described in my co-pending application, Serial No. 291,601, filed June 4, 1952, and now Patent No. 2,738,215.

Another object of the invention is to provide a tool for use in picking up and discarding waste papers, leaves, trash and the like, the present invention being especially suitable for use by military personnel as well as on hospital grounds, parks and lawns, the device also being adapted to be used along streets and highways, and whereby trash can be readily disposed of without the necessity of manually touching the trash so that the danger of contamination or spreading of germs will be minimized.

A further object of the invention is to provide a tool which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the tool, constructed according to the present invention.

Figure 2 is an enlarged side elevational view, with parts broken away and in section.

Figure 3 is a side elevational view, showing the lower end of the tool and with the discard plate in lowered position, and with parts broken away and in section.

Figure 4 is a sectional view taken on the line 4—4 of Figure 2.

Figure 5 is a sectional view taken on the line 5—5 of Figure 2.

Figure 6 is a sectional view taken on the line 6—6 of Figure 2.

Figure 7 is a sectional view taken on the line 7—7 of Figure 2.

Figure 8 is a bottom plan view of a modification wherein prongs are provided for use in gigging fish.

Figure 9 is a fragmentary side elevational view showing the fish gigging prongs of Figure 8.

Figure 10 is a side elevational view of one of the needles or prongs that are being used in the form of the invention shown in Figures 1–7.

Referring in detail to the drawings, the numeral 10 designates an elongated hollow tube which may be made of any suitable material, and a head 11 is connected to one end of the tube 10 by any suitable means, as for example by a threaded connection, Figure 2. The head 11 includes a plurality of faces 12, 13 and 14, Figure 4, and these faces merge into an annular portion 15.

Connected to the other or upper end of the tube 10 is a handle 16, and the handle 16 includes a pair of similar sections 17 and 18 which are interconnected together by bolt and nut assemblies 19, Figure 5.

Slidably or reciprocably arranged in the tube 10 is a cylindrical rod 20, and a collar 21 is connected to the rod 20 by a suitable set screw 22. A coil spring 23 is positioned in the tube 10, and the coil spring 23 is circumposed on the rod 20. The upper end of the coil spring 23 abuts the collar 21, while the lower end of the coil spring 23 abuts a washer 24. The lower surface of the head 11 is triangular shaped, and a discard plate 28 is mounted for movement toward and away from the lower surface of the head 11, the plate 28 also being triangular shaped. The plate 28 is connected to the lower end of the rod 20 so that as the rod 20 is reciprocated in the tube 10 the plate 28 will be moved toward and away from the head 11. A means is provided for connecting the plate 28 to the rod 20, and this means comprises a bushing 26 which is arranged on the lower surface of the plate 28, and a screw 27 extends through the bushing 26 and into engagement with the end of the rod 20. A sleeve portion 25 is formed integral with the rod 20 or secured thereto, and the sleeve portion 25 is arranged on the opposite side of the plate 28 from the bushing 24.

Formed integral with the head 11 or secured thereto is a plurality of spaced parallel fingers 29, and the plate 28 is provided with openings 30 through which slidably extend the fingers 29. A prong or needle 31 is detachably connected to each of the fingers 29, and each of the needles 31 includes a threaded stem 32 which is adapted to be arranged in engagement with a suitable socket in the fingers 29. Each of the prongs 31 further includes a pointed end 33 which is adapted to engage paper, trash or other material that is to be picked up and discarded.

In Figures 8 and 9 there is shown a slightly modified prong which is indicated by the numeral 34. The prongs 34 are each adapted to be detachably connected to the fingers 29, and each of the prongs 34 includes a flaring pointed tip 35. The prongs 34 shown in Figures 8 and 9 are adapted to be used when the tool is to be used for stabbing or gigging fish in shallow water. It is to be understood that the prongs 31 and 34 are interchangeable.

A manually operable means is provided for reciprocating the rod 20 and thereby causing movement of the plate 28 toward and away from the head 11. This means comprises a lever 39 which is pivotally mounted within the hollow portion of the handle 16. A pin 36 pivotally connects the bifurcated portion 38 of the lever 39 to an upper flattened portion 37 of the rod 20. The lever 39 is further provided with a slot 40, and a pin 41 extends through the handle 16 and through the slot 40.

The lever 39 is further provided with a flat surface 42 which is adapted to be engaged by a pivotally mounted hand grip 43. The hand grip 43 is pivotally mounted in the handle 16 by means of a pin or bolt and nut assembly 44.

From the foregoing it is apparent that a tool has been provided which is especially useful for use in picking up trash, leaves, papers or other refuse from the ground. In use, the handle 16 may be gripped in the hand and then the prongs 31 can be arranged in engagement with the paper or other trash. Thus, the paper can be picked up without the necessity of the person bending over, To discharge the refuse or paper from the prongs 31 into a basket or other receptacle, it is only necessary to squeeze the grip member 43 to thereby pivot the grip member 43 about the pin 44. This will cause counterclockwise pivotal movement of the lever 39 about the pin 40 to thereby slide or shift the rod 20 in the tube 10. This downward movement of the rod 20 will cause the plate 28 to move away from the head 11 so that any refuse or papers impaled on the prongs 31 will be ejected from the prongs into the receptacle or other container. When pressure is released on the hand grip 43, the spring member 23 will again return the parts to their normal positions as shown in Figures 1 and 2.

If desired, the tool of the present invention can be used for gigging fish as in shallow water. Thus, when fish are to be gigged, it is only necessary to unscrew the needles or prongs 31 from the fingers 29 and then replace these prongs by the prongs 34, as shown in Figures 8 and 9.

The tool of the present invention will facilitate the picking up and discarding of papers, leaves and trash, and the tool can be used by military personnel as well as on hospital grounds, parks and lawns. It can also be used along the streets and highways and is especially useful by housewives. The device will get under rose bushes and hedges, in holes and ditches or other places where it is not convenient to put the hands. The tool is sanitary since it will eliminate the necessity of touching the rubbish with the hands so that better health and welfare will be promoted. Furthermore, the device can be readily disassembled or put back together as desired. The prongs may be removed for sharpening or when they are to be replaced by prongs of different shapes or sizes. The various parts may be made of any suitable material such as aluminium. The tips of the needles may be made of steel so that they will not readily become worn out or damaged.

I claim:

In a hand tool, a hollow tube of cylindrical shape, a head threadedly connected to the lower end of said tube, said head including a plurality of faces merging into an annular portion, said annular portion surrounding a portion of said tube, a handle mounted on the other end of said tube and including a pair of similar superposed sections detachably connected together, a rod of cylindrical formation slidably mounted in said tube and being of greater length than said tube, a collar fixed to said rod and spaced intermediate the ends thereof, a washer spaced from said collar and mounted on said rod, a coil spring circumposed on said rod and interposed between said collar and washer, the lower surface of said head having a triangular shape, a triangular plate secured to the lower end of said rod and mounted for movement toward and away from said head, said plate corresponding in shape to the lower surface of said head, a bushing arranged on the lower surface of said plate, a screw extending through said bushing and into engagement with said rod, a sleeve portion on said rod arranged on the opposite side of said plate from the bushing, a plurality of spaced parallel fingers extending from said head and secured thereto, said plate being provided with a plurality of openings for the sliding therethrough of said fingers, a prong detachably connected to each of said fingers, each of said prongs including a pointed end which is adapted to engage paper, trash or other material that is to be picked up and discarded, a lever movably mounted in said handle and having a bifurcated portion pivotally connected to a flat portion on the upper end of said rod, there being a slot in said lever, a pivot pin extending through said slot and into engagement with said handle, said lever having a flat portion at the free end, and a hand grip pivotally connected to said handle and constantly engaging with the flat portion of said lever for use in causing movement of the lever, rod and plate, and whereby when pressure is released on the hand grip, the coil spring will move the rod, lever and plate so that the plate moves to a position contiguous to said head.

References Cited in the file of this patent
UNITED STATES PATENTS

| | | |
|---|---|---|
| 273,560 | Lowe | Mar. 6, 1883 |
| 1,959,617 | Dragovitch | May 22, 1934 |
| 2,155,913 | Thompson et al. | Apr. 25, 1939 |
| 2,194,016 | Geller | Mar. 19, 1940 |
| 2,500,647 | Schulthess | Mar. 14, 1950 |
| 2,610,397 | Sutton | Sept. 16, 1952 |

FOREIGN PATENTS

| | | |
|---|---|---|
| 2,316 | Great Britain | of 1881 |